United States Patent Office 3,099,678
Patented July 30, 1963

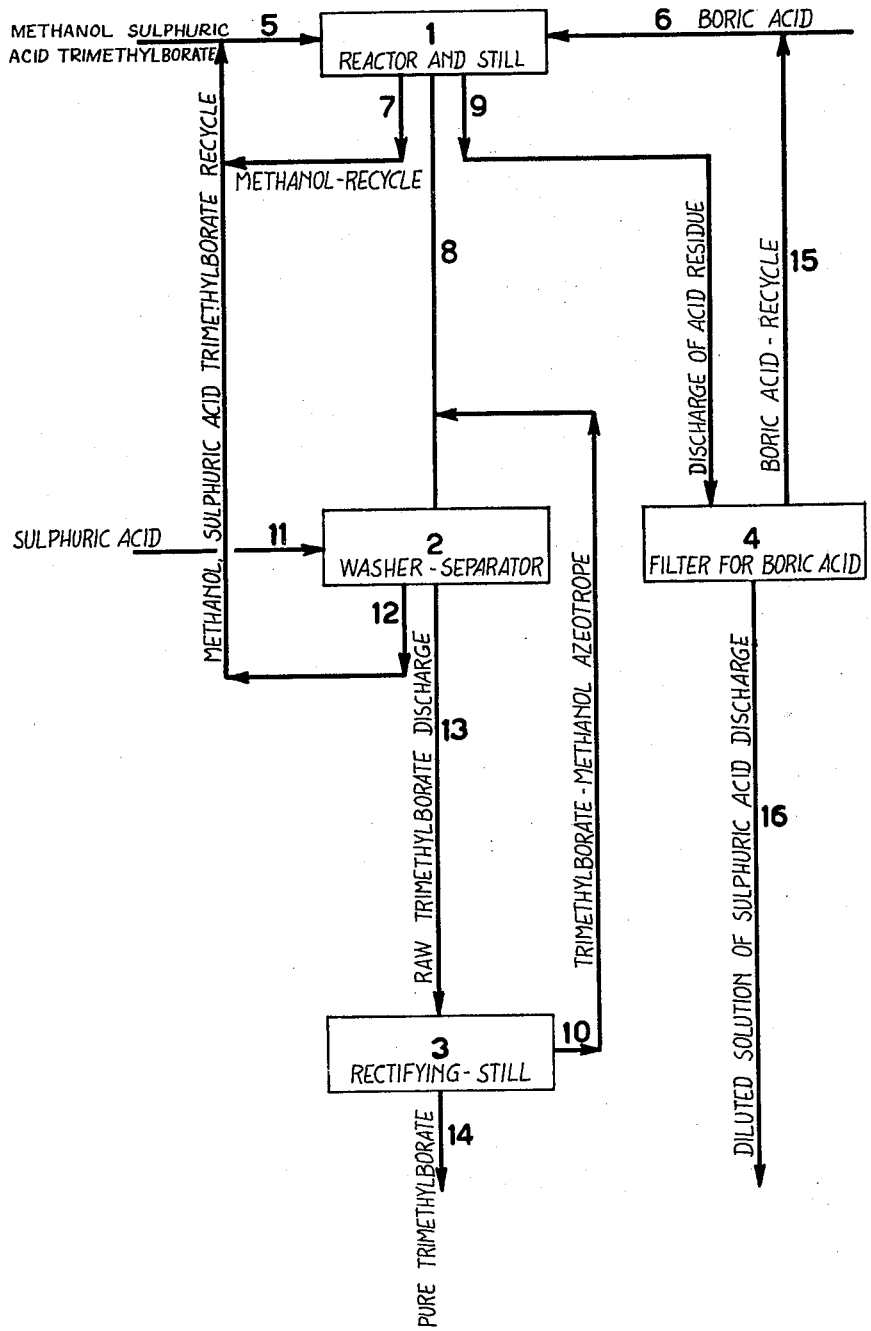

3,099,678
PROCESS FOR THE PREPARATION OF TRIMETHYLBORATE
Lodovico Avogadro di Cerrione, Turin, and Carlo Ferraris, Avigliana, Italy, assignors to Montecatini Societa Generale per l'Industria Mineraria e Chimica, Milan, Italy
Filed Sept. 2, 1960, Ser. No. 53,799
Claims priority, application Italy Sept. 3, 1959
2 Claims. (Cl. 260—462)

This invention relates to the preparation of the boric esters, and particularly of trimethylborate $B(OCH_3)_3$.

Heretofore, the preparation of trimethylborate has been usually carried out by reacting boric acid with methanol or boric anhydride with methanol. In both cases, as first reaction product the trimethylborate-methanol azeotrope is obtained. The composition of the azeotrope is substantially $B(OCH_3)_3 \cdot CH_3OH$. Many methods have been proposed and employed for the separation of the azeotrope. Principally, they are based upon the following techniques:

(1) The use of inorganic salts, such as lithium, sodium, calcium, magnesium or aluminum chlorides, which are very soluble in methanol and scarcely soluble in trimethylborate. Therefore, they induce the separation of the said azeotrope into two layers, one of which consists of almost pure trimethylborate, which can be successively rectified.

(2) The use of liquids which, when added to the said azeotrope, form with methanol a second azeotrope having a boiling point lower than the trimethylborate-methanol azeotrope. A typical example of this is carbon disulphide, which forms with methanol an azeotrope boiling at 38° C.

(3) The use of liquids which are entirely soluble in one of the two components of the azeotrope, and scarcely soluble in the other. In consequence when added to the azeotrope they cause the separation of two layers, from one of which layers it is easy to obtain the pure trimethylborate by distillation. Among such liquids is Vaseline oil, which is completely soluble in trimethylborate and insoluble in methanol. Another is sulphuric acid which is completely soluble in methanol and scarcely soluble in trimethylborate. For the purpose of laboratory preparation, even inorganic salts can be used, particularly calcium or lithium chlorides. For industrial production, Vaseline oil or sulphuric acid is required. However the use of sulphuric acid has heretofore been discouraged, because a considerable amount of trimethylborate is lost in the sulphuric acid-methanol solution.

We have discovered that the use of sulphuric acid as a separating agent of a trimethylborate-methanol azeotrope is made surprisingly advantageous if the acid is recycled in an esterification reactor, thus making feasible the recovery of methanol and trimethylborate, contained therein. The process according to the invention results in the obtaining of a practically quantitative yield, referred either to boric acid or to methanol.

The accompanying drawings illustrate a flow diagram in which 1 is a reactor. The esterification reaction between boric acid and methyl alcohol is carried out in the reactor in the presence of sulphuric acid. The distillation of trimethylborate in the form of an azeotrope with methanol, and the distillation of the excess of the methanol employed for the esterification, are also carried out in reactor 1, which is preferably built of lead, or other material resistant to the action of aqeuous sulphuric acid of 40% concentration, at a temperature ranging from 130 to 150° C.

Through one side, by means of line 5, is fed a methanol-sulphuric acid mixture containing a little trimethylborate, said mixture being obtained by mixing recycled mixtures from lines 7 and 12 with pure methanol. Through the other side, at line 6, solid boric acid is fed, the boric acid being obtained by adding pure boric acid to boric acid recycle line 15. By heating the mixture to boiling, esterification results, with formation of trimethylborate, which is distilled in the same reactor in the form of an azeotrope with methanol. The excess methanol is then distilled off, and recycled through line 7 into the esterification reactor 1.

The acid residue is discharged at high temperature from the reactor, through line 9, and is cooled with consequent precipitation of most of the unreacted boric acid, and is then fed into the filter 4 at room temperature. Here most of the boric acid is recovered and recycled through line 15. From the filter 4 a diluted solution of sulphuric acid, containing the water of esterification and a small amount of methanol and boric acid, is discharged.

The trimethylborate-methanol azeotrope, distilled from the esterification reactor and added to the recycled azeotrope from line 10, is fed into a washer-separator 2, together with a certain amount of concentrated sulphuric acid fed through the line 11. By carrying out, for example, three washings employing different amounts of sulphuric acid, almost pure trimethylborate can be obtained at one side. At the other side there is obtained a sulphuric acid-methanol-trimethylborate mixture, which is recycled into the esterification reactor. The trimethylborate is conveyed, after the said washings with concentrated sulphuric acid, into the still 3 from the head of which the azeotrope is obtained, which azeotrope is recycled through line 10. Pure trimethylborate is removed through line 14.

The conversion of boric acid into trimethylborate in the esterification stages depends chiefly on the proportion of methanol and on the amount of sulphuric acid that is present. It is preferable to employ a molecular ratio of $$\frac{CH_3OH}{H_3BO_3}$$

which is between 1 and 5 times the theoretical one and is preferably 2.5 times the latter, and a weight ratio of $$\frac{H_2SO_4}{H_3BO_3}$$

which is between 0.2 and 1.5 and is preferably 0.6, but other ratios are feasible, with small variations in the boric acid conversion.

Another factor influences the conversion of the reagents, namely the duration of the distillation. When the formation of trimethylborate is too slow, it is preferable to interrupt the distillation of the azeotrope, in order to pass to the recovery of the methanol that is to be recycled into the same reactor.

By employing, for example, a molecular ratio $$\frac{CH_3OH}{H_3BO_3} = 2.3$$

a weight ratio $$\frac{H_2SO_4}{H_3BO_3} = 0.6$$

and 8–10 hours distillation time, 89% conversion of the boric acid can be obtained. These data are referred to the use of pure methanol, and sulphuric acid at 98–100% concentration.

By employing, for example, methanol at 96% and sulphuric acid at 94% the conversions of the boric acid will slightly decrease. The azeotrope obtained has, in general, a trimethylborate content a little lower than the theoretical one of 74.5%. It amounts to about 70–72%.

It is preferable to carry out more than one washing of the azeotrope by concentrated sulphuric acid, for example, three washings.

To exemplify but not to limit the invention, a washing process carried out in three phases or stages is described. Into a separatory funnel, 1,000 parts by weight of a mixture consisting of 70% trimethylborate and 30% methanol are placed. 170 parts sulphuric acid are added, at 100% concentration. The mixture is agitated for some time, then it is let stand. Two layers separate having the following composition:

1st layer—500 parts:
| | |
|---|---|
| Sulphuric acid _____percent__ | 34 |
| Trimethylborate _____do____ | 13.2 |
| Methanol _____do____ | 52.8 |

2nd layer—670 parts:
| | |
|---|---|
| Sulphuric acid_____ | Trace |
| Trimethylborate _____percent__ | 94.5 |
| Methanol _____do____ | 5.5 |

The operation is repeated, employing the second layer, by previously adding 35 parts sulphuric acid at 100% concentration; again two layers are formed having the following composition:

1st layer.—70 parts:
| | |
|---|---|
| Sulphuric acid _____percent__ | 50 |
| Trimethylborate _____do____ | 11 |
| Methanol _____do____ | 39 |

2nd layer.—635 parts:
| | |
|---|---|
| Sulphuric acid_____ | Trace |
| Trimethylborate _____percent__ | 98.5 |
| Methanol _____do____ | 1.5 |

For a third time the same operation is carried out, employing the latter second fraction or layer by again adding previously 23 parts sulphuric acid at 100% concentration. Two layers are formed having the following percent composition:

1st layer.—46 parts:
| | |
|---|---|
| Sulphuric acid _____percent__ | 50 |
| Trimethylborate _____do____ | 33 |
| Methanol _____do____ | 17 |

2nd layer.—612 parts:
| | |
|---|---|
| Sulphuric acid_____ | Trace |
| Trimethylborate _____percent__ | 99.5 |
| Methanol _____do____ | 0.5 |

The 700 parts of trimethylborate which are generally present in the azeotrope, at the end of the operation, carried out in three phases, are separated as follows: 609 parts of trimethylborate at 99.5% concentration, with an extraction yield corresponding to $$\frac{609}{700} \times 100 = 87\%$$

of trimethylborate at 99.5% purity, which can be further rectified to 100% purity.

The total yield of the esterification is practically quantitative, based on either boric acid or methanol. By operating according to above-mentioned conditions the yield based on boric acid varies from 96 to 98%, that based on methanol from 94 to 96%.

It is to be understood that the second layers indicated on columns 5 and 6 represent the upper layers.

We claim:

1. A process for making trimethylborate, $B(OCH_3)_3$, comprising esterifying boric acid with methanol in the presence of sulphuric acid, to form a methanol-trimethylborate azeotrope, separating said azeotrope from excess methanol, employing the recovered methanol for esterification of boric acid in the presence of sulphuric acid, discharging the aqueous acid residue occurring in the esterification step, separating unreacted boric acid from said residue and employing it for esterification by methanol, washing the azeotrope with concentrated sulphuric acid, separating the resulting mixture into mixture fractions by differential specific gravities, one fraction containing less sulphuric acid than the other, and treating the latter fraction with concentrated sulphuric acid in a second washing stage, and again separating the resulting mixture into fractions by differential specific gravities, one of the latter comprising, substantially, trimethylborate, and utilizing both of the sulphuric acid fractions separated from the washing stages for the esterification of boric acid with methanol.

2. A process for making trimethylborate, comprising esterifying boric acid with a stoichiometric excess of methanol in the presence of sulphuric acid, to form a methanol-trimethylborate azeotrope, distilling off said azeotrope from excess methanol, returning the recovered methanol to the said esterification of boric acid in the presence of sulphuric acid, discharging the aqueous sulphuric acid residue occurring in the esterification step, separating unreacted boric acid from said residue and returning it to said esterification reaction, washing the azeotrope with concentrated sulphuric acid, separating the resulting mixture into mixture fractions, one fraction containing less sulphuric acid than the other, and treating the latter fraction with concentrated sulphuric acid in a second washing stage, and again separating the resulting mixture into fractions, one of the latter comprising, substantially, trimethylborate, and returning the sulphuric acid-methanol fractions separated from the washing stages to the esterification of boric acid with methanol.

References Cited in the file of this patent

Cohn: Pharm. Zentralhalle, vol. 52, pp. 479–85 (1911).
Schlesinger et al.: J. Am. Chem. Soc., vol. 75, pp. 213–15 (1953).